United States Patent [19]

Toman

[11] Patent Number: 4,587,323

[45] Date of Patent: May 6, 1986

[54] POLYESTER RESIN GELKOTE COMPOSITION

[75] Inventor: Perry A. Toman, Medina, Ohio

[73] Assignee: SCM Corporation, New York, N.Y.

[21] Appl. No.: 728,398

[22] Filed: Apr. 29, 1985

[51] Int. Cl.$^4$ ............................................. C08G 18/62
[52] U.S. Cl. ..................................... 528/66; 528/75; 560/25; 560/26; 560/158
[58] Field of Search ...................... 528/66, 75; 560/25, 560/26, 158

[56] References Cited

U.S. PATENT DOCUMENTS

| | | | |
|---|---|---|---|
| 4,289,682 | 9/1981 | Peters | 528/75 |
| 4,304,883 | 12/1981 | Fujii et al. | 528/298 |
| 4,413,111 | 11/1983 | Markusch et al. | 528/75 |

*Primary Examiner*—Maurice J. Welsh
*Attorney, Agent, or Firm*—A. Joseph Gibbons; Thomas M. Schmitz

[57] ABSTRACT

An improved hydroxyl functional urethane-extended polyester is based on the condensation reaction of fumaric acid, one or more non-aromatic polyols, azelaic acid and optionally one or more non-aromatic carboxylic acids including lauric acid or stearic acid. The hydroxylated polyester urethane oligomer possesses a molecular weight below 2600 and a mole ratio of hydroxyl groups to urethane linkage of from 0.5 to 6. Gel coats prepared from these oligomers exhibit superior water resistance and improved weathering characteristics.

8 Claims, No Drawings

POLYESTER RESIN GELKOTE COMPOSITION

This invention relates to coating compositions based on unsaturated polyester urethane polymers and gel coats prepared therefrom.

BACKGROUND OF THE INVENTION

Conventional gelcoat compositions, typically formulated from polyester, acrylate, and urethane type resins and combinations thereof are useful as the exterior paint layer for boats and bathroom fixtures such as shower stalls, bath tub enclosures and the like. A gel coat is a pigmented, filled, and prepromoted resin (usually polyester) which is sprayed with an initiator onto molds from a high pressure spray gun to a film thickness of up to 0.75 mm. The film cures prior to reinforcement with glass fibers and laminating resins. The gel coat should exhibit low viscosity at high shear, should resist sagging, and have a gel time of about 8-12 minutes. For marine and other applications, the products require hydrolytic stability and good weatherability.

Use of unsaturated polyesters in admixture with unsaturated aromatic monomers such as styrene used for the production of crosslinked polymers intiated by peroxide is well known. The unsaturated polyesters are prepared from the condensation of unsaturated acids or acid anhydrides with diols and polyols. The most common unsaturated acid used is either maleic anhydride or fumaric acid. Because ester linkages formed from these materials exhibit poor hydrolysis resistance, the overall film performance of a coating film based on these polymers is somewhat poor. In addition, an aromatic diacid, such as phthalic and isophthalic acid, is generally present and the molecular weight of the polymer is maintained above a number average molecular weight of 2000 to achieve the hydrolysis resistance of the film. However, the presence of the aromatic nuclei in the polymer backbone and the necessity to add high levels of unsaturated aromatic monomers to obtain sprayable viscosity lead to poor exterior durability in the coated product.

A coassigned application Ser. No. 728,299 filed concurrently has relevancy to the instant case in that it pertains to the same end use. U.S. Pat. No. 4,304,883 (1981) (Fujii, Tanaka et al) teaches unsaturated polyester resins for coating metal substrate comprising a vinyl monomer and a dicyclopentadiene modified alkyd. U.S. Pat. No. 4,320,221 teaches the reaction of ethylenically unsaturated monofunctional isocyanate and a difunctional polyol as an anerobic adhesive. Other coatings incorporate conventional isophthalic and phthalic based urethane polyesters having various pendant unsaturation.

Urethanes have been incorporated into useful coatings via various techniques. U.S. Pat. No. 3,928,299 (1975) teaches vinyl solution polymers which contain urethane groups and are crosslinkable by vinyl or vinylidene polymerization. The urethane groups are introduced by reacting hydroxy groups pendant from the acrylate backbone with isocyanoalkyl acrylates or methacrylates. Urethane modified epoxy ester resins are taught in U.S. Pat. No. 3,478,126.

Unruh and Smith, U.S. Pat. No. 2,887,469 (1959), teach urethane derivatives of hydroxy containing polymers such as ethyl cellulose, cellulose acetate using monohaloalkyl isocyanate and quaternary urethanes formed with tertiary amines. U.S. Pat. No. 2,768,154 teaches polymeric carbalkoxy urethane via the reaction of carbalkoxy isocyanate (O=C=N—R—COOR$^1$) with hydroxy functional polymers. U.S. Pat. Nos. 4,446,175 and 4,436,885 (1984) teach isocyanate-functional acrylic solvent copolymers of 2-isocyanotoethyl(-meth)acrylate with other acrylate monomers in the presence of a mercaptan chain-transfer agent.

U.S. Pat. No. 4,320,221 (1982) teaches the reaction of ethylenically unsaturated monofunctional isocyanate and a difunctional polyol as an anerobic adhesive.

U.S. Pat. No. 4,287,323 (1981) teaches addition polymerizable polyethers having pendant ethylenicaly unsaturated urethane groups as useful flooring materials. Such urethane polyethers are prepared by reacting a polyether polyol (hydroxy terminated polypropylene glycol) with an isocyanatoalkyl(meth)acrylate.

U.S. Pat. No. 4,273,690 (1981) teaches a graft copolymer binder for coatings having an acrylic backbone and alkyd resin chains attached to the backbone by an isocyanate group reactive with the hydroxyl or carboxylic group of the alkyd resin.

Others have attempted to reduce gel coat problems such as blistering or extended water exposure by increasing the film thickness of the gel coat (See Denoms et al, Annual Conference, Reinforced Plastics/Composites Institute, The Society of the Plastics Industry, Inc., Feb. 7-11, 1983).

Vinyl esters based on aromatic polyepoxide resin reacted with unsaturated monocarboxylic acid and other moieties are exemplified in U.S. Pat. Nos. 3,367,992; 3,066,112; and 3,179,623. The presence of the aromatic nuclei and the necessity of adding high levels of unsaturated aromatic monomers to obtain a sprayable viscosity leads to unacceptable exterior durability while those based on aliphatic polyepoxides show poor hydrolysis resistance.

The above deficiencies have been largely overcome by the gel coats of the present invention based on specific hydroxy functional urethane extended polyester oligomers. The improved coatings provide gel coats with low viscosity and excellent hydrolytic and weathering stability.

BRIEF SUMMARY OF THE INVENTION

The invention relates to a coating composition comprising a hydroxyl functional urethane-extended unsaturated polyester free of isocyanate functionality and having a free hydroxyl to urethane mole ratio of from 0.5 to about 6.0; wherein said urethane extended polyester is the reaction product of a non-aromatic hydroxylated unsaturated polyester oligomer number average molecular weight of from about 500 to 2000 and a non-aromatic diisocyanate, polyisocyanate or isocyanate terminated prepolymer; said polyester oligomer drived by condensation polymerization of fumaric acid or a fumaric acid precursor with a polyol comprising a major portion of neopentyl glycol, one or more non-aromatic dicarboxylic acids and optionally one or more non-aromatic monocarboxylic acids.

Another aspect relates to gel coat composites comprising 50 to 90 weight percent hydroxy functional urethane polyester having a molecular weight of from about 1000 to about 3000 and a free hydroxyl to urethane linkage mole ratio of from about 0.5 to 6.0; and 10 to 50 weight percent aromatic vinylic monomer, wherein said unsaturated polyester is derived from a non-aromatic unsaturated polyester oligomer.

A further aspect relates to a substrate, particularly boats and sanitary ware, formulated from the above gel coats and a reduced amount of about less than 30 weight percent of styrene monomer, wherein such coated substrate exhibits improved hydrolytic and weathering properties.

DETAILED DESCRIPTION OF THE INVENTION

This invention relates to improved urethane-extended unsaturated polyester oligomers and gel coats comprising the oligomer and up to 30 weight percent (total components) of aromatic vinylidine compound such as styrene capable of hardening the composition by double bond polymerization with the unsaturated polyester.

The urethane oligomers represent the reaction product of a hydroxyl functional unsaturated polyester and a non-aromatic diisocyanate. The polyester is the condensation of one or more polyols, one or more dicarboxylic acids, optionally one or more monocarboxylic acids and possesses acid numbers of from 5 to about 25 and hydroxyl functionality in 0.5 to 2.0 mole excess of that required for complete reaction of the isocyanate functionality to form the urethane extended polyester.

The preferred polyol is neopentyl glycol which comprises at least 40 percent of the total glycol content required for the preparation of polyester. When desired for imparting particular properties, other glycols such as, for example, hydrogenated bisphenol A, cyclohexanedimethanol, hexanediols and octanediol-1,8,trimethylol propane, trimethylol ethane, and pentaerthritol may be used in amounts up to about 60 weight percent basis total glycol and preferably in amounts of 20 to 40 weight percent basis total glycol.

Both the monocarboxylic acids and the dicarboxylic acids useful in preparing the unsaturated polyesters are required to be non-aromatic acids. At least a major portion (moles) of the diacid used to prepare the unsaturated polyester must be fumaric acid or fumaric acid precursor components, i.e. maleic anhydride, maleic acid. When maleic acid and/or maleic anhydride is used, it is preferred to use a catalyst that will enhance the conversion to fumaric acid. The balance of the carboxylic acid can be supplied by azelaic acid, adipic acid, dodecanedioc acid and the like. Optionally one or more non-aromatic dicarboxylic acids including lauric acid, stearic acid and the like can make up to 35 weight percent of the acid for the development of particular coating properties. Other such acids include 2-ethylhexanoic acid, palmitic acid, myristic acid, caprylic acid, capric acid, pelargonic acid, heptanoic acid, and isostearic acid.

Preferred unsaturated polyester oligomers will exhibit relatively low free-acid functionality (acid number 5 to 25) and sufficient hydroxyl functionality in excess of that required to react with the isocyanate groups to form urethane extended polyester oligomers. The polyester oligomers will have molecular weight (number average) in the range of from 500 to above 2000 and preferably about 1000. The urethane polyesters will be formulated to exhibit number average molecular weights below 3000 and preferably not to exceed 2200 depending in each case on the intended end use of the particular coating.

Useful non-aromatic diisocyanates for the formation of urethane extended polyesters include isophorone diisocyanate, hexamethylene diisocyanate, tetramethylene diisocyanate, 2,2,4-trimethylhexane diisocynate, 2,4,4-trimethylhexane diisocyanate, and 4,4-dicyclohexylmethane diisocyanate. Isophorone diisocyanate is the preferred reactant. Isocyanate terminated prepolymer may be used in partial or complete substitution for the diisocyanate monomer. Useful prepolymers include the reaction product of about 2.0 moles of a diisocyanate with about 1.0 to 1.5 moles of an aliphatic diol or polyol—the reaction product of isophorone diisocyanate with neopentyl glycol being a preferred prepolymer.

In the formation of gel coats, the urethane extended unsaturated polyester is mixed at weight percentages of from about 65 to 85 with one or more ethylenically unsaturated aromatic present at 35 to 15 weight percent (basis total composition). For this purpose, the ethylenical unsaturation is adapted to participate in the gel/cure crosslinking reaction with at least a portion of the fumaric unsaturation present in the polyester chain. Styrene is the preferred monomer for this use although other suitable monomers such as p-methyl styrene, methyl methacrylate, dicyclopentadienyl methacrylate, t-butyl styrene, divinylbenzene, and vinyltoluene can be substituted in whole or in part for the styrene monomer.

The gel coats can be clears or can be formulated as pigmented gel coats using the common additives and pigments known to the art. These include, for example, talcs, clays, pigments, silicas, promoters, ultraviolet stabilizers, and thickeners.

Although not wishing to be bound thereby, it is believed that the desirable properties of the instant coatings are achieved by a suitable combination of soft segments provided by the polyester portion and hard segments provided by the urethane portion. It is also believed that the reduction of viscosity in the coating allows gel coat formulations at lower aromatic vinyl components than heretofore allowed in conventional polyester coatings.

TEST PANEL PREPARATION

Lupersol DDM-9 (1.2%) is added to the gel coat paint and stirred with a spatula for 30 minutes. Drawdown on a waxed and buffed flat tempered glass plate using a 7/16×16" drawdown bar. After curing for 3–4 hours, 3 plys of fiberglass mat are applied with resin (30% mat/70% resin). Lupersol DDM-9 (1.2%) catalyst is added. Allow 40–60 minutes after the gel time of the laminating resin for cure. Remove the laminate from the mold and cut into test strips (film thickness 18–22 mls.).

BOILING WATER RESISTANCE

Coated test panels (4¼×4¼) are connected to the boiling water test tank (ANSI 2-124.1) and exposed to boiling water for 100+ hours. The exposed panels are rated on a scale of 0–5 for blisters, color change, change in fiber prominence, cracks and loss of visible gloss with 0=no change and 5=maximum change

QUV WEATHERING

Coated test panels are subjected to the weathering test as per ANSI/ASTM G 53-77 rest procedure using the standard cycle of 4 hours condensation at 50° C. followed by 8 hours UV exposure at 70° C. Test panels are inspected at intervals of 150 hours.

Although the following examples are representative of the invention, they should not be read in a restrictive manner. All parts and percentages are by weight and all temperatures are expressed in degrees Centigrade unless otherwise specified.

EXAMPLE 1 (COMPARATIVE)

Preparation of a Conventional Isophthalic Acid Unsaturated Polyester Resin

In a reactor provided with a stirrer, a thermometer, a water separating column fitted with a reflux condenser, and a nitrogen inlet is added the following ingredients:

| Component | Grams |
| --- | --- |
| Neopentyl Glycol | 2633 |
| Propylene Glycol | 499 |
| Adipic Acid | 219 |
| Isophthalic Acid | 2240 |
| Maleic Anhydride | 1467 |
| Piperidine | 8.8 |

The charged mixture is heated to reflux and a total of 750 parts of water distilled off. The reaction mixture is then held at 220° C. until an acid number of 18-28 is obtained.

The reaction mixture is then cooled to less than 140° C. and the following ingredients are added:

| Component | Grams |
| --- | --- |
| Methoxyhydroquinone | 0.9 |
| Styrene | 2932 |
| Copper Napthenate | 1.0 |

The resulting solution has a Gardner-Holt bubble type viscosity of $Z-Z_1$ at 67.5% non-volatile by weight.

EXAMPLE 2 (COMPARATIVE)

Preparation of a Conventional Gel Coat Coating

A gel coat coatings composition is then prepared by blending the follwing ingredients:

| Components | Weight Percent |
| --- | --- |
| Resin solution from comparative Example 1 | 55.45 |
| Potassium Hex-Cem* | 0.25 |
| "Lo-Vel" 27* | 3.50 |
| "Mistron" Monomix* | 10.00 |
| Titanium Dioxide | 11.00 |
| "Chem-All" 12% Cobalt* | 0.20 |
| Styrene | 19.40 |
| Ethylene Glycol | 0.20 |

*Potassium Hex-Cem and Chem-All are trademarks of Mooney Chemicals; Lo-Vel is a trademark of PPG Industries; Mistron is a trademark of Cyprus Industrial Minerals Co.

The resulting paint has a Brookfield viscosity of approximately 300 cps at 77° F. and a thixotropic index of 5-6. The paint contains 37% styrene by weight and 13.4% by weight of a polymerized aromatic diacid.

The weathering characteristics as measured by OUV are listed below.

| Hours | ΔE | % Gloss Retention |
| --- | --- | --- |
| 150 | 8.68 | 75.0 |
| 300 | 8.66 | 3.6 |

A panel was immersed in boiling water for 100 hours and exhibited some loss of gloss and slight blister formation.

EXAMPLE 3

Preparation of a Non-Aromatic Polyester-Urethane Polymer

In a reactor fitted with a stirrer, a thermometer, a water separating column, and a nitrogen inlet is added the following ingredients:

| Component | Grams |
| --- | --- |
| Neopentyl Glycol | 1550 |
| Fumaric Acid | 719 |
| Azelaic Acid | 818 |

The charged mixture is heated to reflux and a total of 373 grams of water distilled off. The reaction mixture is then held at 220° C. until an acid number of less than 7 is achieved.

The reaction mixture is cooled to 120° C. and 0.8 grams of dibutyl tin dilaurate added to the mixture followed by dropwise addition of 413 grams isophorone diisocyanate. After all the diisocyanate is added, the reaction mixture is maintained at 120° C. until no free isocyanate groups are detected by infra-red spectroscopy or by titration.

Then the mixture is cooled to 90°-100° C. and 0.6 grams hydroquinone followed by 928 grams of styrene are added. The resulting solution has a Gardner-Holt bubble tube viscosity of $Z_1-Z_2$ at 75% non-volatile by weight.

EXAMPLE 4

Preparation of a Coating based on the Non-Aromatic Polyester-Urethane Polymer

A gel coat coatings composition is prepared by blending the following ingredients:

| Component | Weight Percent |
| --- | --- |
| Polyester-Urethane from Example 3 | 64.51 |
| Potassium Hex-Cem | 0.25 |
| "Lo-Vel" 27 | 1.50 |
| "Aerosil"* 200 | 2.50 |
| "Mistron" Monomix | 10.00 |
| Titanium Dioxide | 11.00 |
| "Chem-All" 12% Cobalt | 0.30 |
| Styrene | 9.74 |
| Ethylene Glycol | 0.20 |

*Aerosil is a trademark of Degussa Inc.

the resulting paint has a viscosity of 100 cps and a thixotropic index of 5-6. The paint contains 26% styrene.

The weathering characteristics as measured by OUV are listed below.

| Hours | ΔE | % Gloss Retention |
| --- | --- | --- |
| 150 | 2.00 | 96.6 |
| 300 | 2.01 | 94.4 |

A panel was immersed in boiling water for 100 hours and its performance judged as equal to the coating made from comparative Example 2.

EXAMPLE 5

Using the procedure of Example 3, a polyester urethane oligomer was prepared from the following components:

| Component | Grams |
| --- | --- |
| Maleic Anhydride | 786 |
| Neopentyl Glycol | 990 |
| Hydrogenated bisphenol A | 421 |
| Lauric Acid | 267 |
| Azelaic Acid | 133 |
| Piperidine | 2.7 |

Th polyester was processed at a lower temperature, namely 180°–190° C. until an acid number of 25–30 was attained. Thereafter the polyester was extended with isophorone diisocyanate (324 grams) using dibutyltin dilaurate catalyst and reaction continued until no free isocyanate groups were detected. After dilution with styrene, the resulting solution exhibited a Gardner-Holt bubble tube viscosity of $Z_4$–$Z_5$ at 75% non volatile by weight.

The paint was formulated as in Example 4 and evaluated for weathering characteristics (QUV) and for water boil resistance. The weathering characteristics as measured by QUV are listed below.

| Hours | ΔE | % Gloss Retention |
| --- | --- | --- |
| 150 | 1.19 | 98.1 |
| 300 | 1.92 | 93.2 |

The coating of Example 5 exhibited gloss retention, non-yellowing (ΔE) properties, and water boil performance superior to those of Examples 2 and 4.

EXAMPLE 6

The relationship of theoretical hydroxyl number of the urethane polyester to water boil resistance was evaluated using the produce of Examples 2, 4, and 5 and varying the total hydroxyl functionality content by using larger amount of lauric acid in the polyester preparation as shown in the following table:

| Calc. Hydroxyl Number | % Lauric Acid | Total Water Boil Score* |
| --- | --- | --- |
| 80 | 5.4 | 6–7 |
| 40 | 9.2 | 5 |
| 20 | 14.3 | 6 |

*Based on a scale of 0–25 where 0 equals no change and 25 signifies total failure; total score is obtained by adding individual ratings (0–5) for blisters, color change, fiber prominence, cracks and loss of gloss.

What is claimed is:

1. A coating composition suitable for preparing gel coat composites which comprises a hydroxy functional urethane-extended unsaturated polyester free of isocyanate functionality and having a free hydroxyl to urethane mole ratio of from about 0.5 to 6; wherein said urethane extended polyester is the reaction product of a non-aromatic hydroxylated unsaturated polyester, having a number averge molecular weight of from about 500 to 2000 derived by condensation polymerization of fumaric acid or a fumaric acid precursor with one or more non-aromatic glycol, one or more non-aromatic dicarboxylic acids, optionally one or more non-aromatic monocarboxylic acids, with a non-aromatic diisocyanate, polyisocyanate, or isocyanate functional prepolymer.

2. The composition of claim 1 wherein the non-aromatic dicarboxylic acid is selected from the group consisting of azelaic acid, adipic acid, and dodecanedioc acid, said diisocyanate is isophorone diisocyanate, and said non-aromatic glycol comprises at least 40 weight percent neopentyl glycol.

3. The composition of claims 1 and 2 wherein the unsaturated polyester polymerization is effected in the presence of at least one saturated monocarboxylic acid selected from the group consisting of lauric acid, stearic acid, 2-ethylhexanoic acid, and pelargonic acid.

4. The composition of claim 3 wherein dicarboxylic acid is azelaic acid, the saturated monocarboxylic acid is lauric acid, and the non-aromatic glycol comprises neopentyl glycol and hydrogenated bisphenol A.

5. An improved gel coat composition comprising
   50 to 90 weight percent of a hydroxy functional urethane-extended unsaturated polyester resin free of isocyanate functionality and having a hydroxyl to urethane mole ratio of from about 0.5 to about 6.0; said polyester containing double bond unsaturation sufficient to react via vinyl polymerization with a copolymerizable vinyl monomer to impart water boil resistance and improved weathering to a gel coat composite; and
   10 to 50 weight percent of a copolymerizable vinyl monomer;
   wherein said urethane-extended polyester resin has a molecular weight of from about 1000 to 3000 and is the reaction product of a hydroxyl functional nonaromatic unsaturated polyester oligomer and a non-aromatic diisocyanate and said hydroxyl functional non-aromatic polyester, having a number average molecular weight of from about 500 to 2000, is the condensation polymer of fumaric or fumaric acid precursor with one or more non-aromatic glycols, one or more non-aromatic dicarboxylic acid and optionally one or more non-aromatic monocarboxylic acid.

6. The composition of claim 5 wherein the vinyl monomer is an aromatic vinylic monomer present in an amount of less than 30 weight percent basis combined total weights of aromatic vinyl monomer plus urethane extended polyester.

7. The composition of claim 6 wherein the vinylic monomer is styrene and the diisocyanate is isophorone diisocyanate.

8. The composition of claim 5 wherein the unsaturated polyester resin is the reaction product of fumaric acid or fumaric acid precursor with neopentyl glycol, hydrogenated bisphenol A, azelaic acid and lauric acid further extended with ispphorone diisocyante.

* * * * *